US006131053A

United States Patent [19]

Nyffenegger et al.

[11] Patent Number: 6,131,053

[45] Date of Patent: *Oct. 10, 2000

[54] HIGH SPEED DOCUMENT PROCESSING MACHINE

[75] Inventors: David Nyffenegger, Raleigh, N.C.; Glen Allen Nester, Pottstown, Pa.

[73] Assignee: Bell & Howell Mail and Messaging Technologies Company, Durham, N.C.

[ * ] Notice: This patent is subject to a terminal disclaimer.

[21] Appl. No.: 09/328,450

[22] Filed: Jun. 9, 1999

Related U.S. Application Data

[62] Division of application No. 09/060,758, Apr. 16, 1998, abandoned, which is a division of application No. 08/586,271, Jan. 16, 1996, Pat. No. 5,826,869, which is a continuation of application No. 08/544,911, Oct. 18, 1995, abandoned.

[51] Int. Cl.[7] .......................... G06F 7/00

[52] U.S. Cl. .................. 700/220; 270/52.02; 270/52.09; 270/52.12

[58] Field of Search .......................... 270/52.02, 58.06, 270/52.09, 52.11, 52.12; 700/220, 221, 222, 223

[56] References Cited

U.S. PATENT DOCUMENTS

| | | | |
|---|---|---|---|
| 3,606,728 | 9/1971 | Sather et al. . | |
| 3,983,679 | 10/1976 | Zemke . | |
| 4,142,238 | 2/1979 | Brandt et al. . | |
| 4,475,729 | 10/1984 | Costigan . | |
| 4,506,339 | 3/1985 | Kuhnlein . | |
| 4,525,788 | 6/1985 | Gottlieb et al. | 700/221 |
| 4,527,790 | 7/1985 | Piotroski | 700/220 |
| 4,527,791 | 7/1985 | Piotroski . | |
| 4,593,893 | 6/1986 | Suter . | |
| 4,707,790 | 11/1987 | Gomes et al. . | |
| 4,987,547 | 1/1991 | Rabindran et al. . | |
| 4,992,950 | 2/1991 | Francisco | 700/220 |
| 5,083,281 | 1/1992 | Rabindran et al. . | |
| 5,164,906 | 11/1992 | Mahmoodi et al. | 700/220 |
| 5,181,705 | 1/1993 | Helffrich et al. . | |
| 5,321,624 | 6/1994 | Helffrich et al. | 700/222 |
| 5,448,490 | 9/1995 | Gottlieb et al. | 700/220 |
| 5,704,603 | 1/1998 | Nalecz et al. . | |
| 5,724,791 | 3/1998 | Pishny et al. . | |
| 5,754,434 | 5/1998 | Delfer et al. . | |
| 5,818,724 | 10/1998 | Brewster, Jr. et al. | 700/220 |
| 5,826,869 | 10/1998 | Nyffenegger et al. | 270/52.02 |

*Primary Examiner*—Christopher P. Ellis
*Assistant Examiner*—Patrick Mackey
*Attorney, Agent, or Firm*—Millen, White, Zelano & Branigan, P.C.

[57] ABSTRACT

The invention is directed to a high-speed document-processing machine, comprising a diverse-set-compilation section, comprising a burster having a local non-Distributed Control System controller; a reader and an accumulator having a reader/accumulator Distributed Control System Local Control Module; a folder and a diverter having a folder/diverter Distributed Control System Local Control Module; a buffer having a buffer Distributed Control System Local Control Module; wherein all of said Local Control Modules are interconnected via a multi-drop communication link; said burster local non-distributed control system is connected to said reader/accumulator Local Control Module via a communication link; and, said reader/accumulator Local Control Module is a Command Module including means for dynamically controlling the speed of said burster based on the state of one or more variables affecting the speed at which downstream devices can operate.

5 Claims, 15 Drawing Sheets

I/O INTECONNECT
0039515-998

HIGH SPEED DOCUMENT PROCESSING MACHINE

This application is a divisional of application Ser. No. 09/060,758 filed Apr. 16, 1998 abandoned; which is a divisional of Ser. No. 08/586,271 filed Jan. 16, 1996, U.S. Pat. No. 5,826,869 which is a continuation of Ser. No. 08/544,911, filed Oct. 18, 1995, now abandoned.

This Application is related to U.S. application Ser. No. 08/544,690, entitled "SERPENTINE MULTI-STAGE BUFFER FOR DOCUMENT-PROCESSING MACHINE," on behalf of Leonard Neifert, et al. The entire disclosure of that application is incorporated herein by reference.

This application includes a microfiche appendix which has a total of 1 microfiche and a total of 32 frames.

BACKGROUND OF THE INVENTION

1. Field of the Invention

The invention relates in general to machines for automated processing of mailpieces, and in particular to a dynamic speed control system for improving throughput rate in an insertion machine.

2. Related Art

Computer-controlled insertion machines have been known for providing high-speed, automated insertion of documents into envelopes. Such insertion machines typically include a continuous form feeder, or "roll unwind," for supplying a web of attached sheets (or a sheet feeder for supplying individual sheets), with several adjacent sheets being associated together as a set; a burster or cutter for separating the web into individual sheets, those sheets including for each set a master document having an optical mark thereon for providing insertion instructions and other information about the set; a reader for reading the optical mark and providing the information therein to a central computer; an accumulator for accumulating individual sheets fed seriatim thereto into stacked sets; a folder for folding the sets; a series of insert hoppers for selectively feeding inserts onto the folded sets as the sets travel past the hoppers on an insert track/conveyor; an insert station for inserting each set and its associated inserts into an envelope; a sealer for sealing and closing the flap on the envelopes; and, a postage meter for applying postage to the completed mail piece.

The "base inserter" (also referred-to herein as the "base machine" or "host inserter") of the above-described machines, e.g., the insert hoppers and all devices downstream from them, can typically operate at a constant, high throughput rate. To take full advantage of that throughput rate, however, sets must be accumulated by upstream devices of the machine (e.g., the burster, reader, accumulator and folder) and delivered to the base inserter at a rate which equals the base inserter's constant throughput rate.

If all sets are identical, e.g., if all sets have the same number of sheets (referred to herein as "set size") and all sheets have the same form length, then each of the upstream devices can be set to output its product at a rate which is tied to the base inserter's throughput rate and the throughput of the entire machine can be maximized. For example, if the base inserter is operating at a throughput of 100 inches-per-second (ips), and two-sheet sets are being accumulated, then the accumulator can output sets at 100 ips and the burster and reader can output single sheets at 200 ips.

However, if individual sets in a batch vary in set size and/or form length, then if the above relationships between output speeds remain constant, the rate at which sets are delivered to the base inserter will vary as the set size or form length varies. Because this delivery rate varies, it cannot be set so as to be constantly optimized for a constant rate at which the base inserter is operating.

Individual devices in typical machines of the prior art have been programmed to process and feed out documents or sets of documents "on-demand." That is, when a device finishes processing a particular document or set of documents, it waits to output its document(s) until it receives a message from the next downstream device stating that the downstream device is ready to receive the document(s). Thus, a bottleneck at a particular device can cause all upstream devices to be slowed, resulting in a reduced total throughput of the machine.

Further, in typical computerized insertion machines of the prior art, each device is operated synchronously. That is, each device outputs its documents in synch with a machine cycle. If the next downstream device is not ready to receive those documents at a particular machine cycle, the device holds its contents until the next machine cycle. However, this results in further reduction of throughput in that there may be a time lag between the time at which the downstream device is ready and the next machine cycle.

OBJECTS AND SUMMARY OF THE INVENTION

It is an object of the invention to provide an improved document-processing machine.

It is a further object of the invention to provide a document-processing machine having a sheet-supplying means which operates asynchronously at a speed which gradually increases and decreases dynamically based upon the state of a plurality of variables affecting downstream throughput rate.

It is a further object of the invention to provide a document-processing machine having a diverse-set-compilation section which can output document sets of varying length and/or size to a base inserter at a rate which approaches or equals the maximum rate at which the base inserter can receive them.

In a preferred embodiment, the invention provides a document-processing machine having a sheet-supplying means for supplying a seriatim stream of sheets; an accumulator means for accumulating the stream of sheets into sets; a reader means for reading a mark on a document and decoding the mark to obtain information regarding the set to which the document belongs; a buffer means for storing accumulated sets; and means for controlling a speed at which the sheet-supplying means operates based upon the state of one or more variables affecting the speed at which downstream devices can process sheets. Such variables include, e.g., the number of accumulated sets in the buffer means, the set size of a set being processed, the form length of sheets within a set being processed, and the speed at which a downstream base insertion machine can receive sets.

BRIEF DESCRIPTION OF THE DRAWINGS

The foregoing and other objects, features, and advantages of the invention will be apparent from the following more-particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
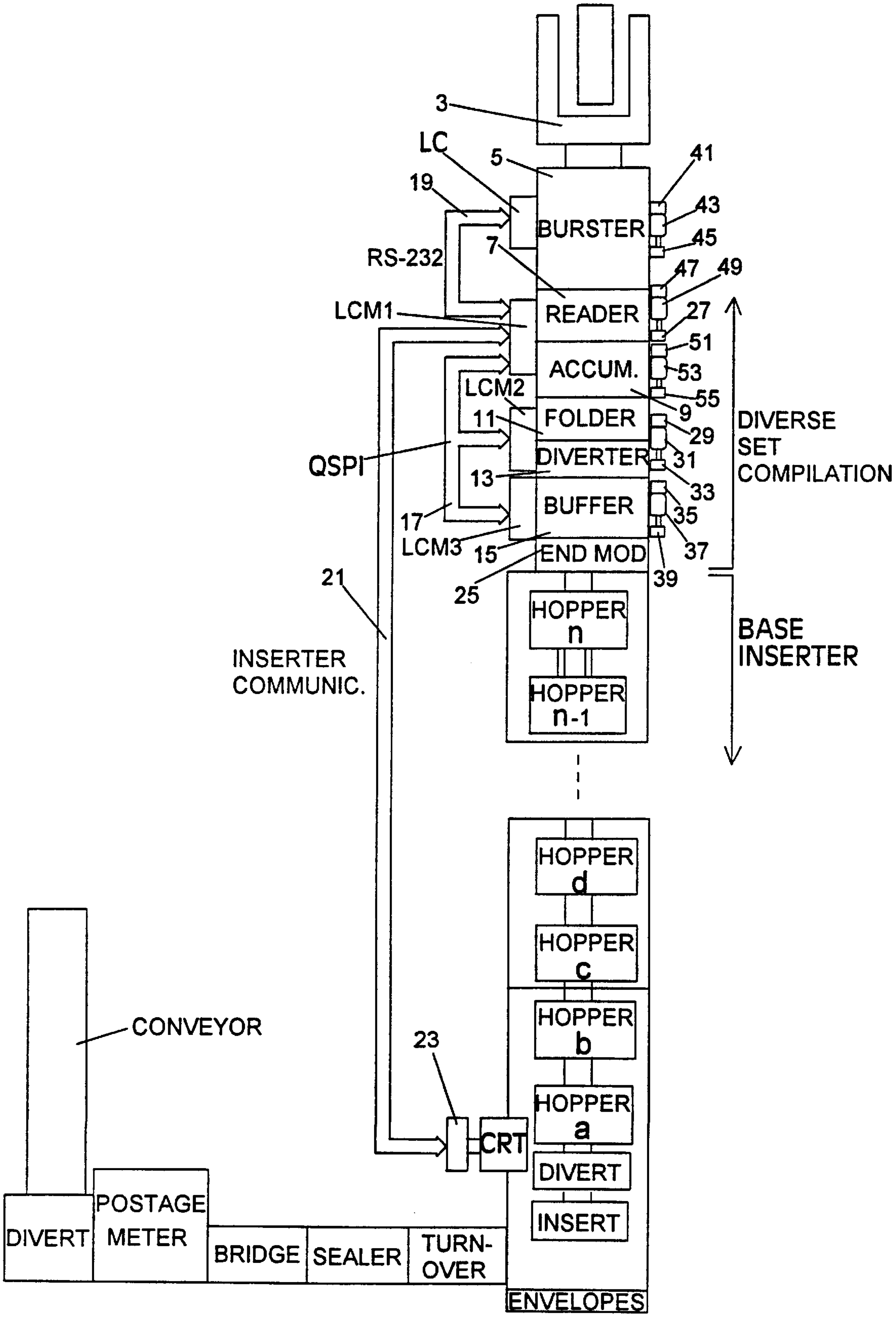
FIG. 1 illustrates a schematic block diagram of the invention according to a first embodiment.
Figure 2A:
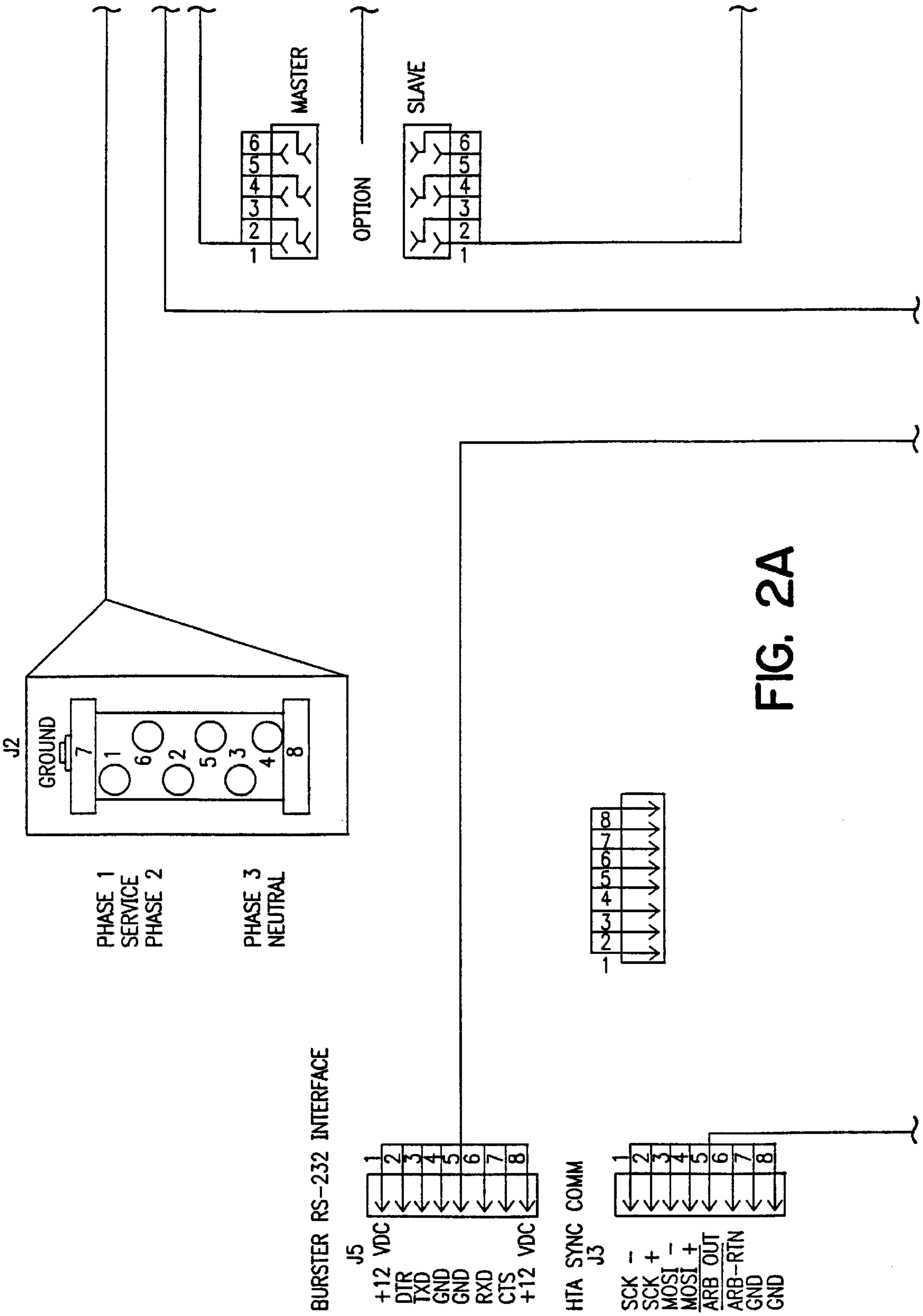
FIG. 2 illustrates a schematic diagram of certain electronic portions of the invention according to a first embodiment.
Figure 2B:
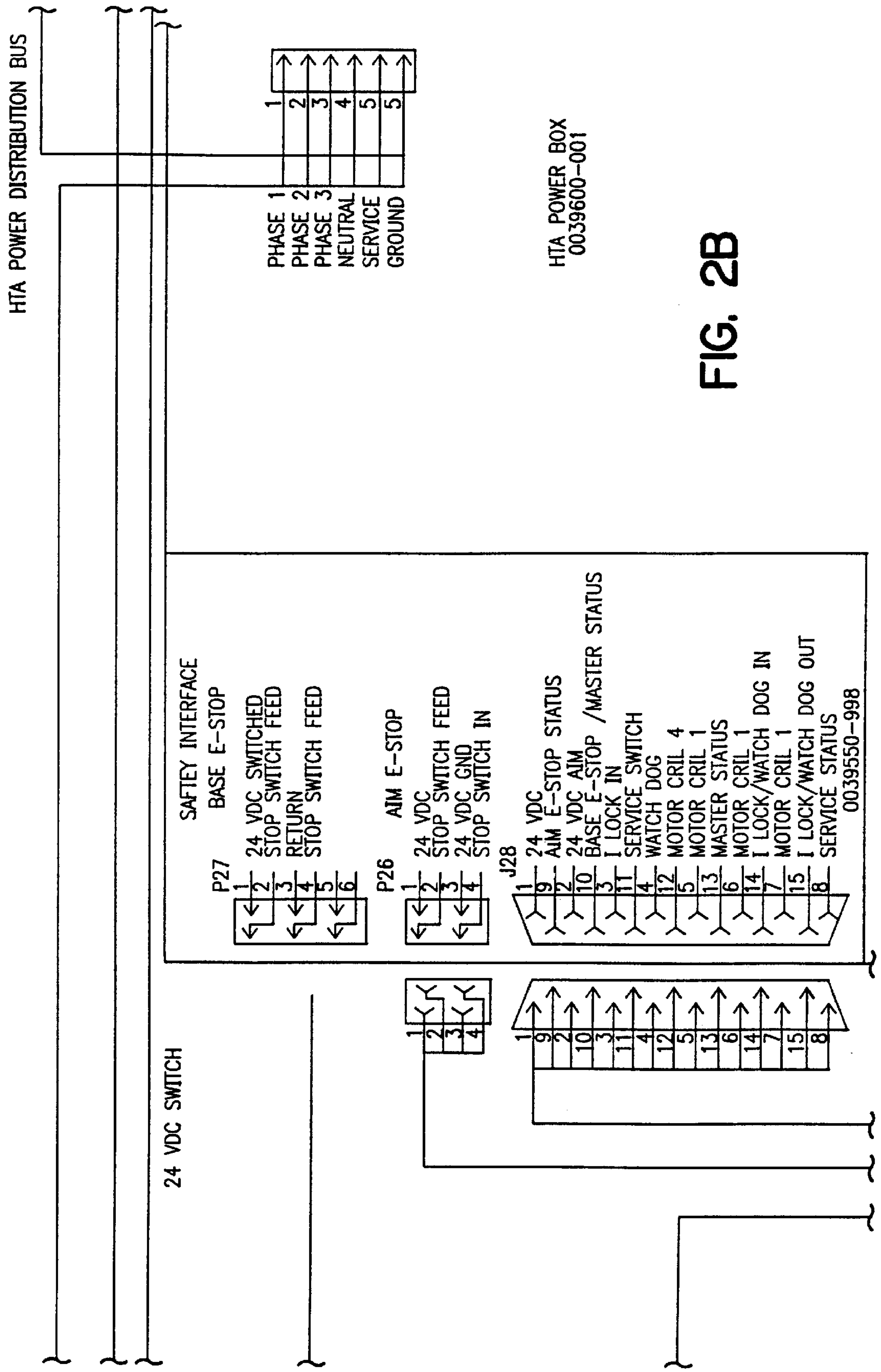
Figure 2C:
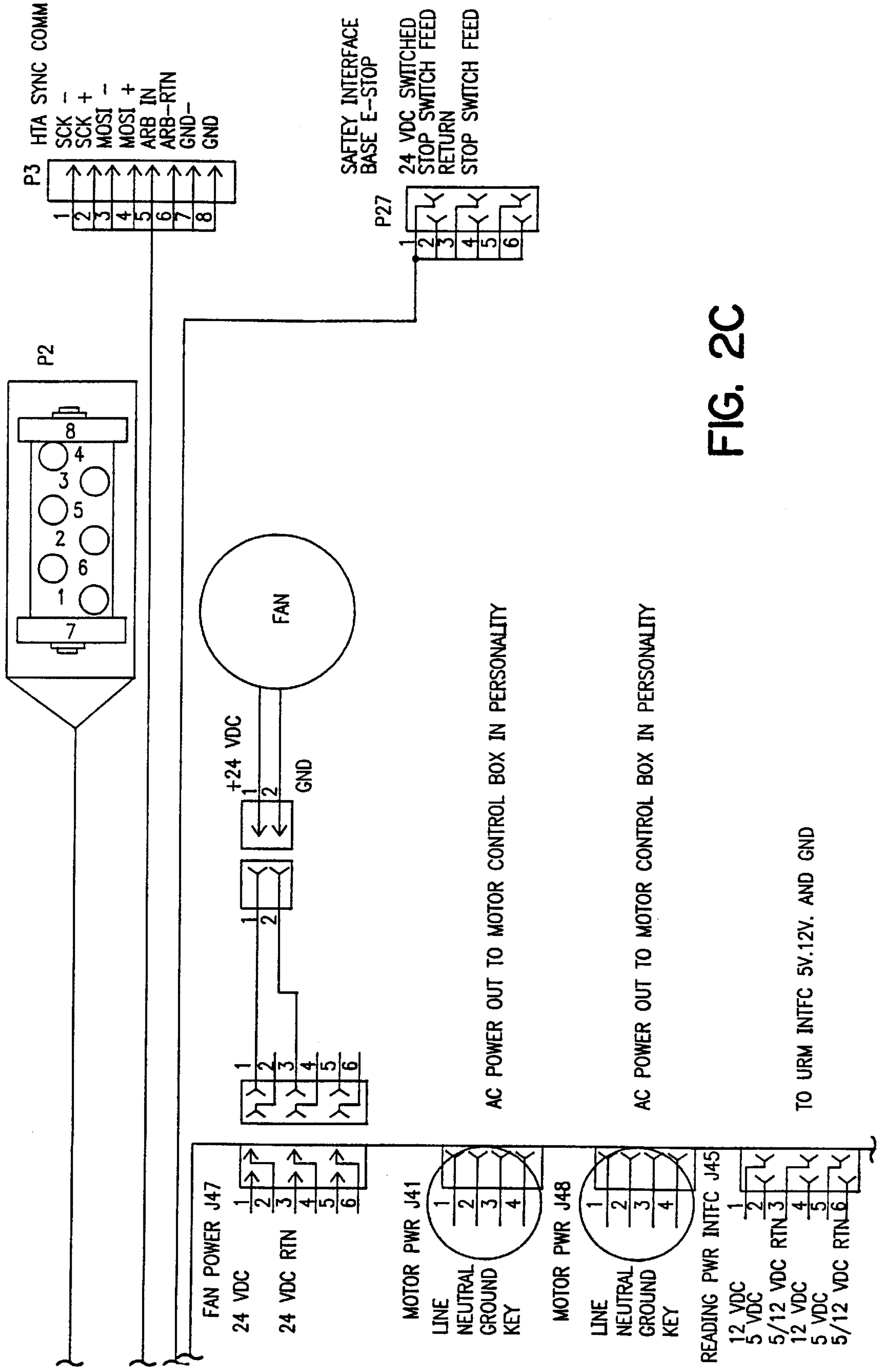
Figure 2D:
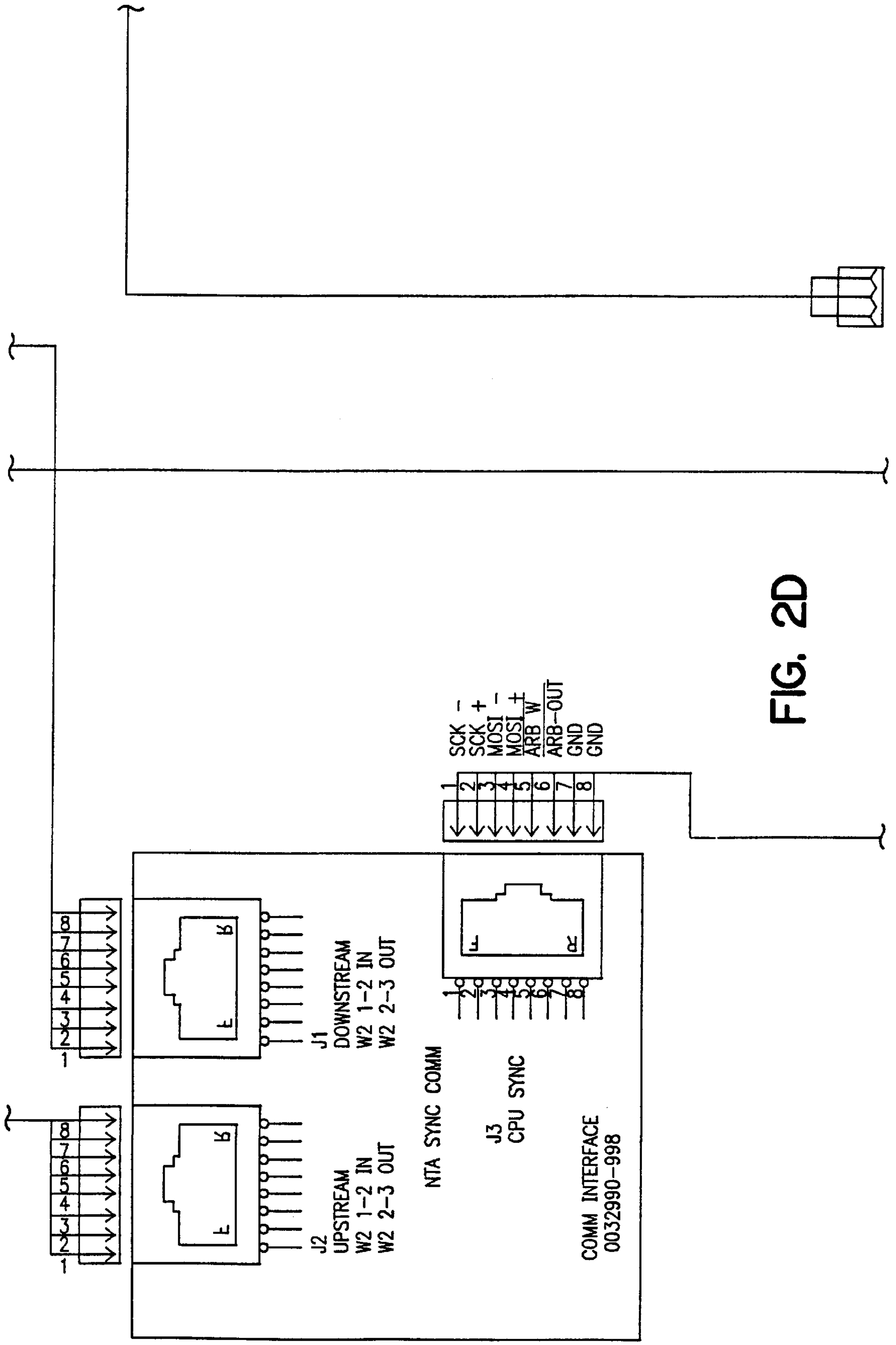
Figure 2E:
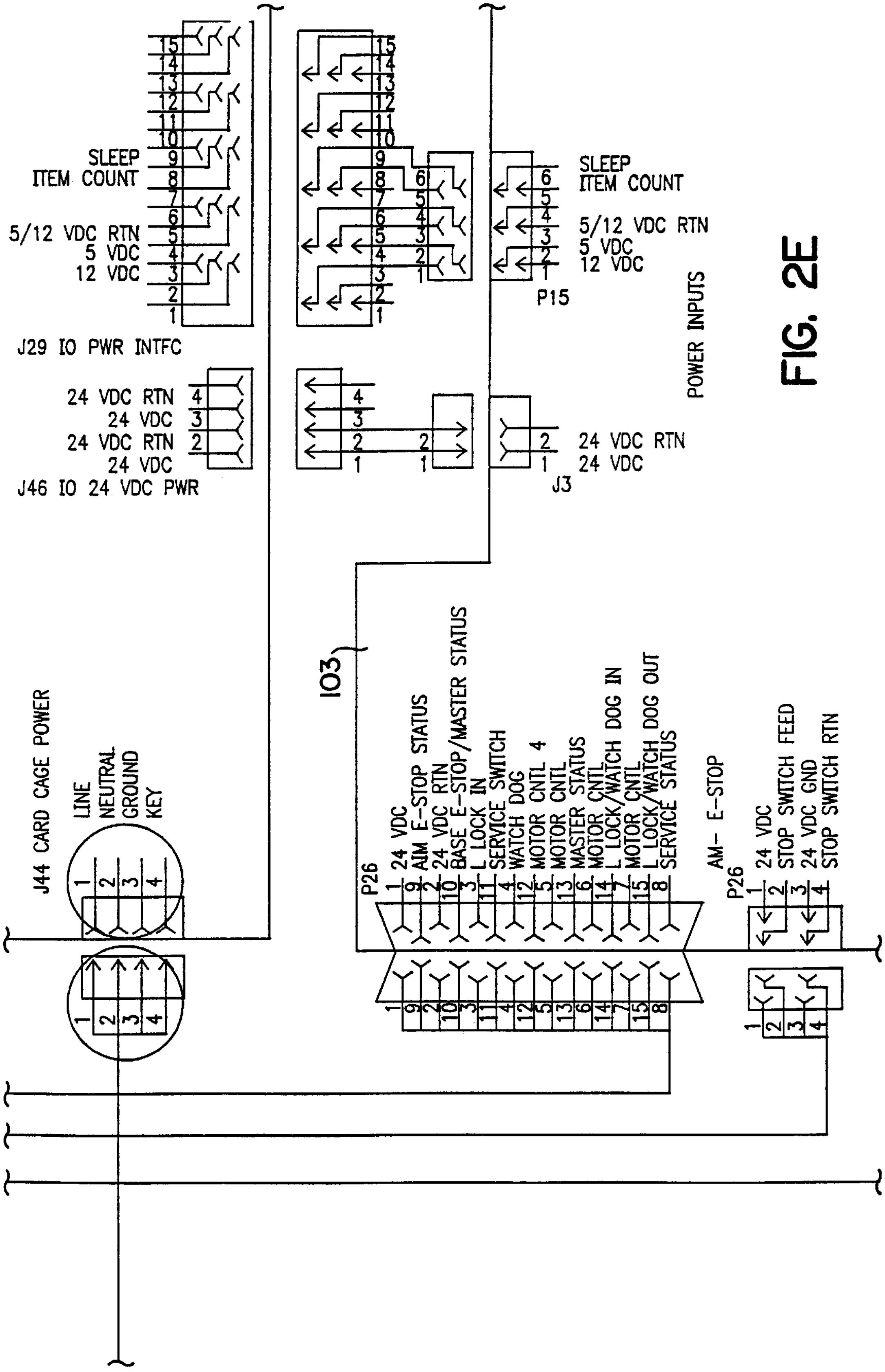
Figure 2F:
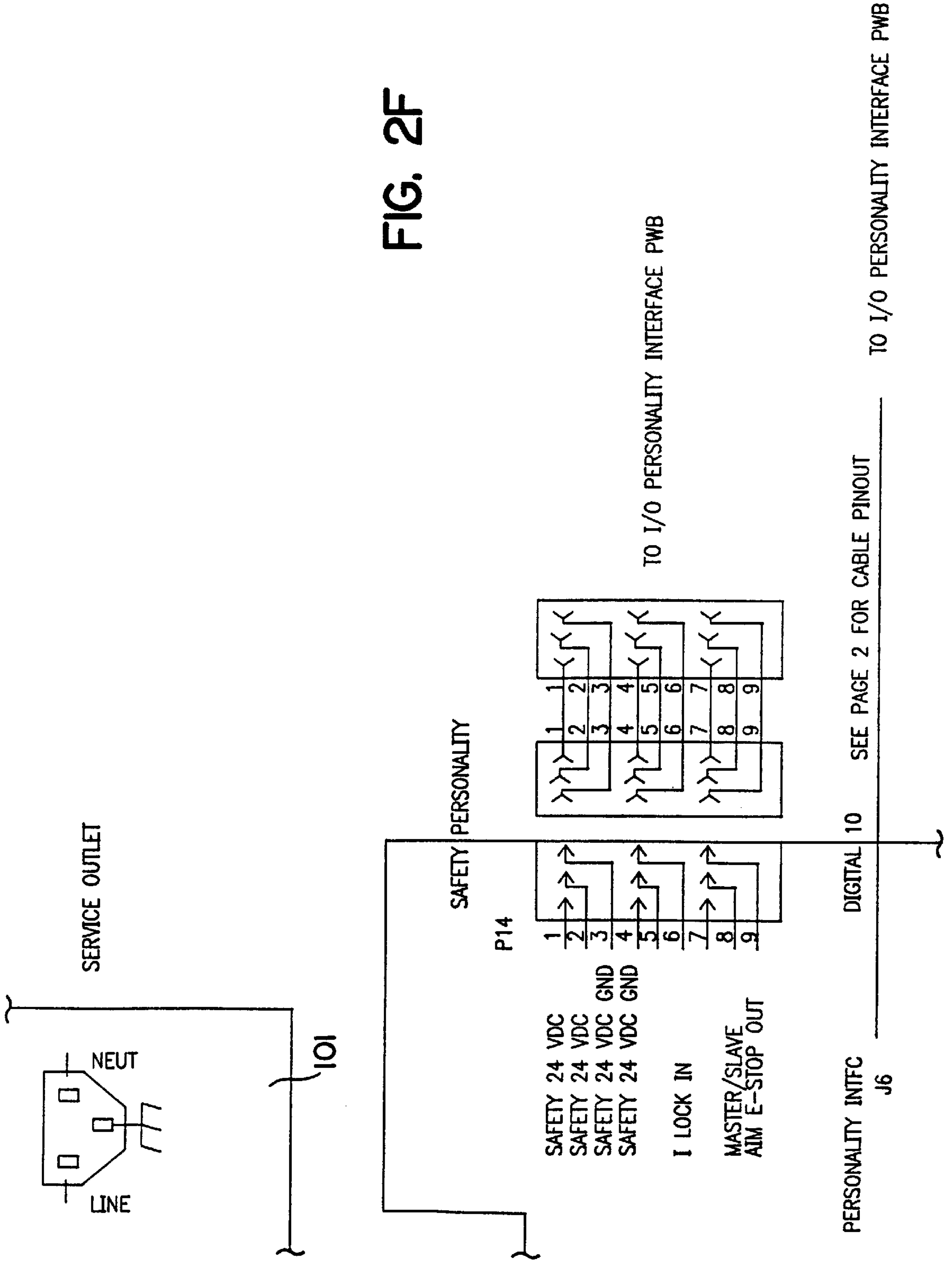
Figure 2G:
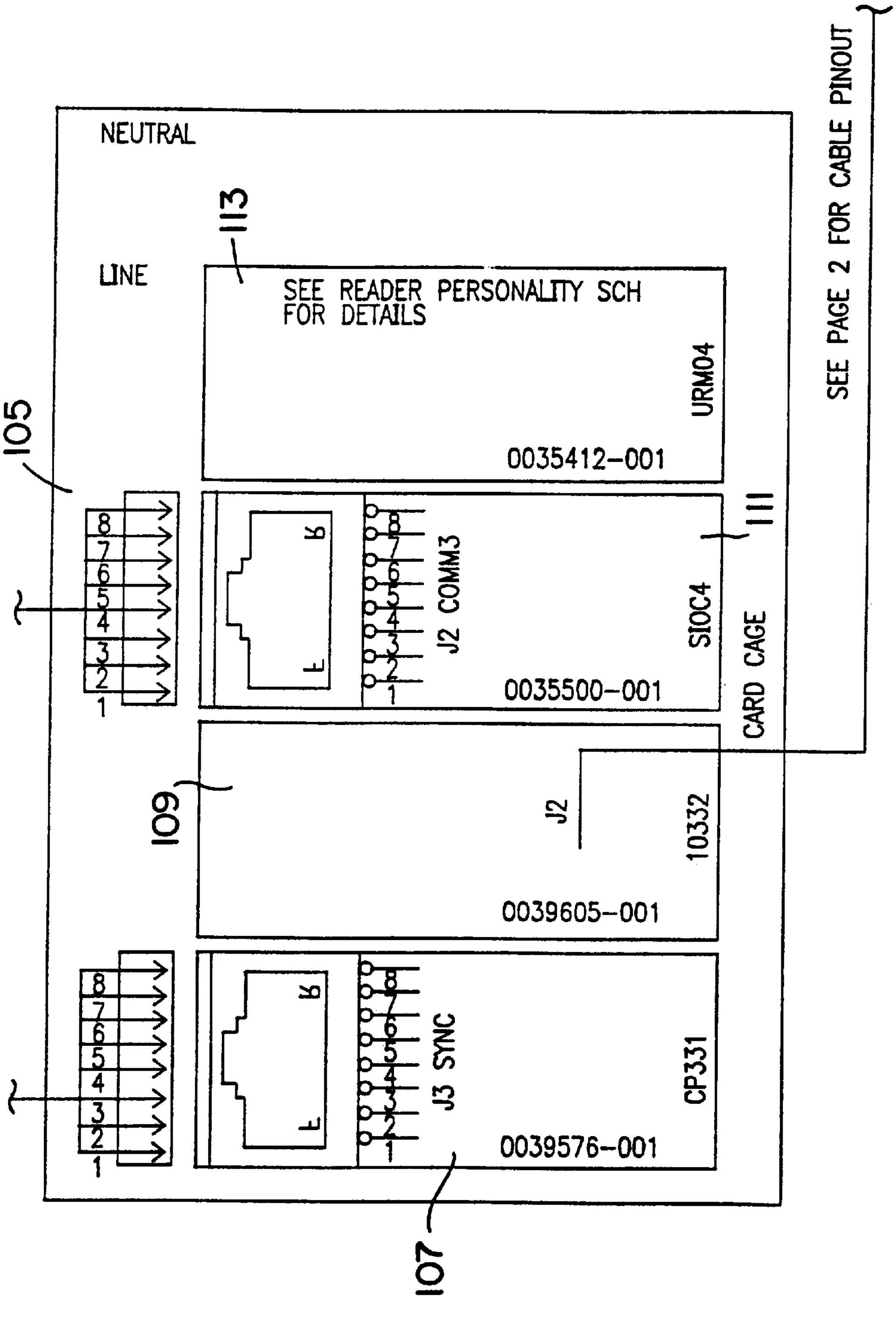
Figure 2H:
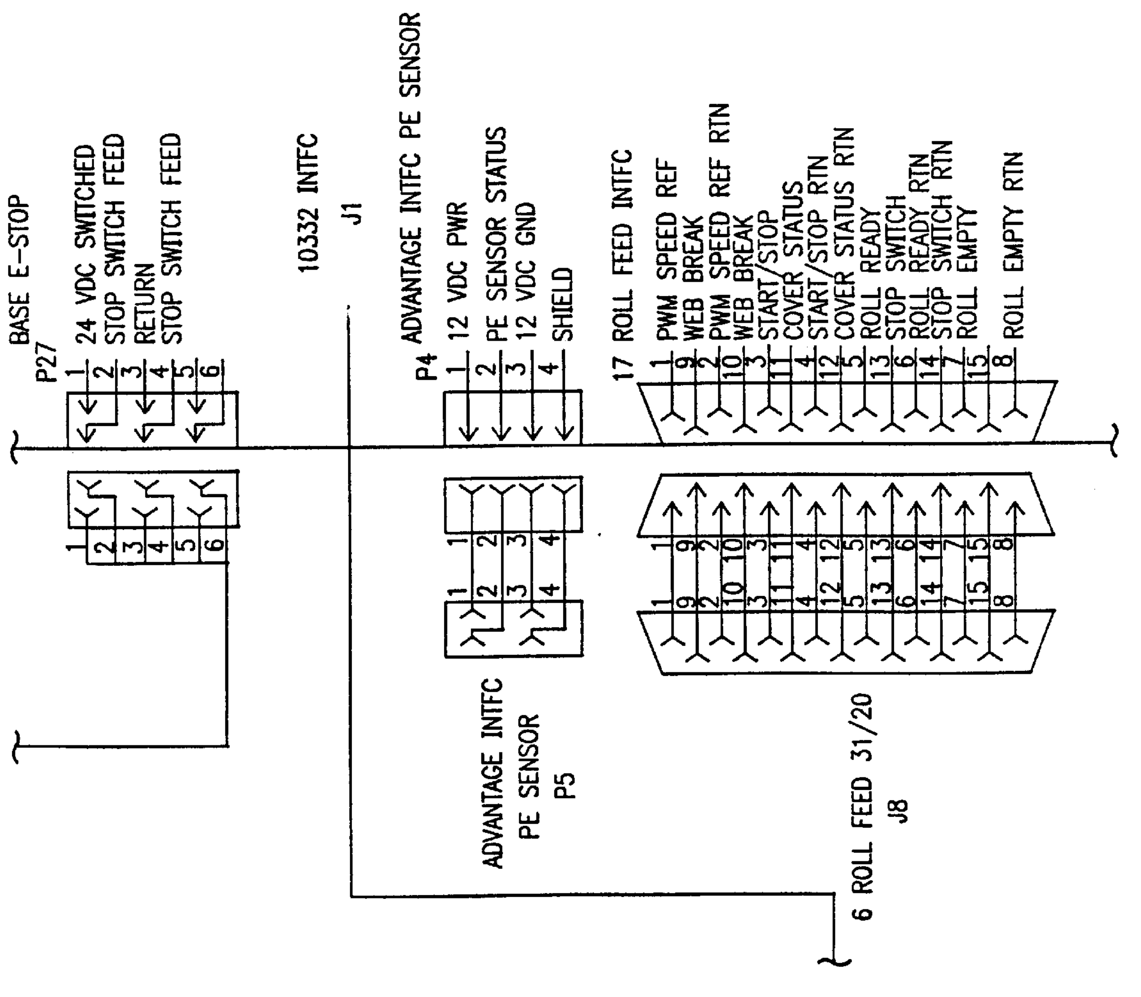
Figure 2I:
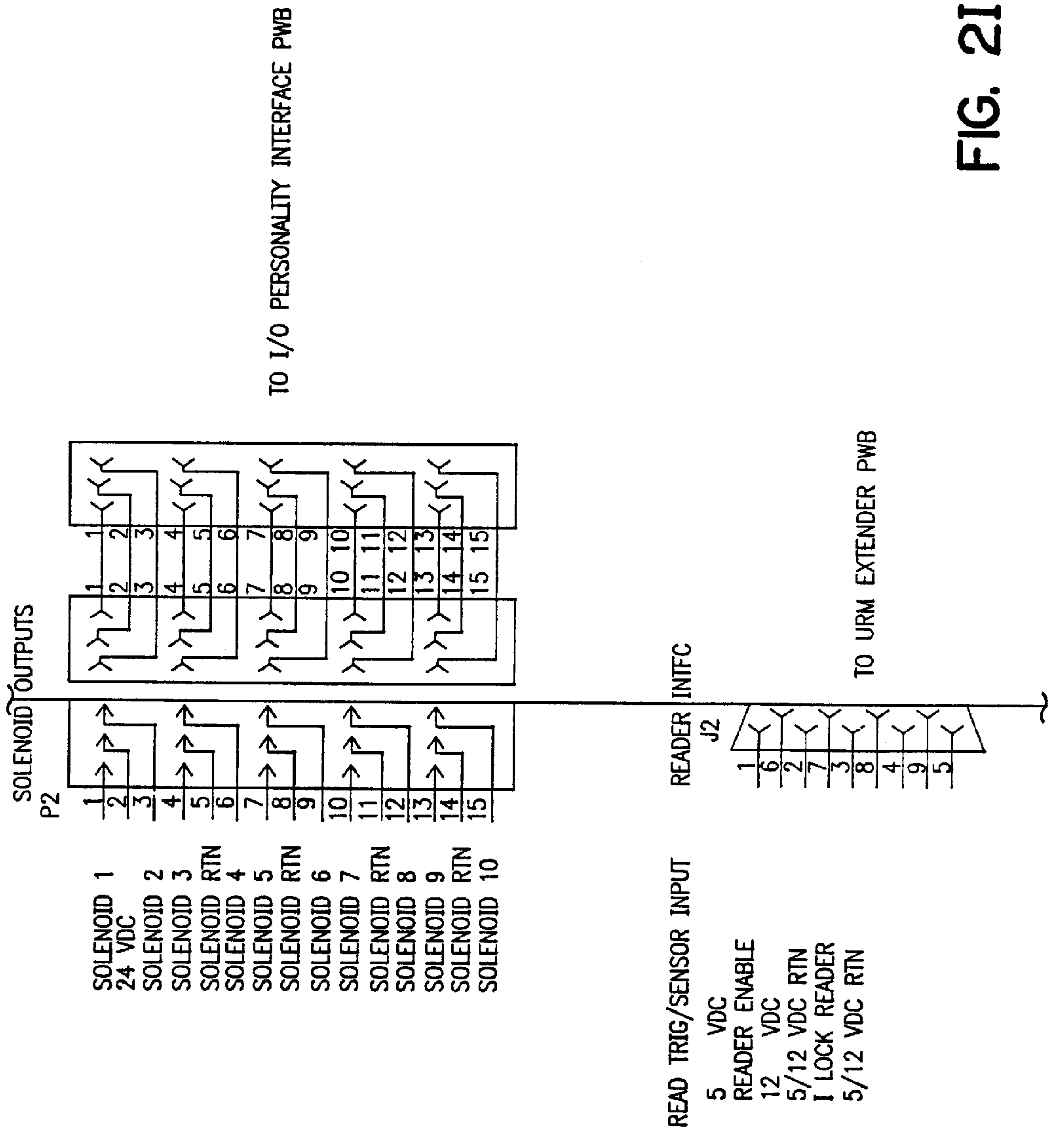
Figure 2J:
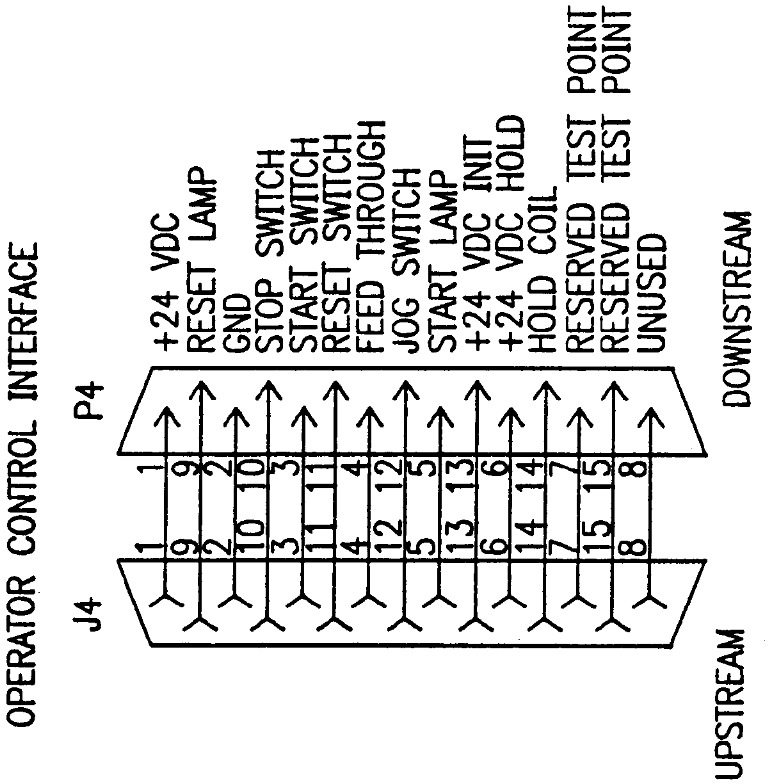
Figure 2K:
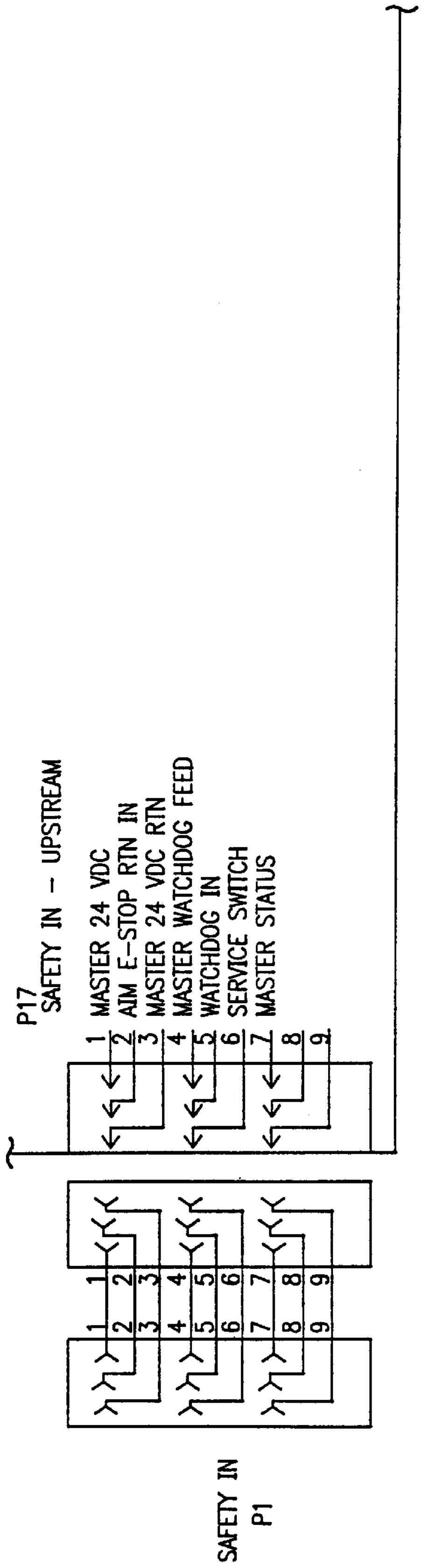
Figure 2L:
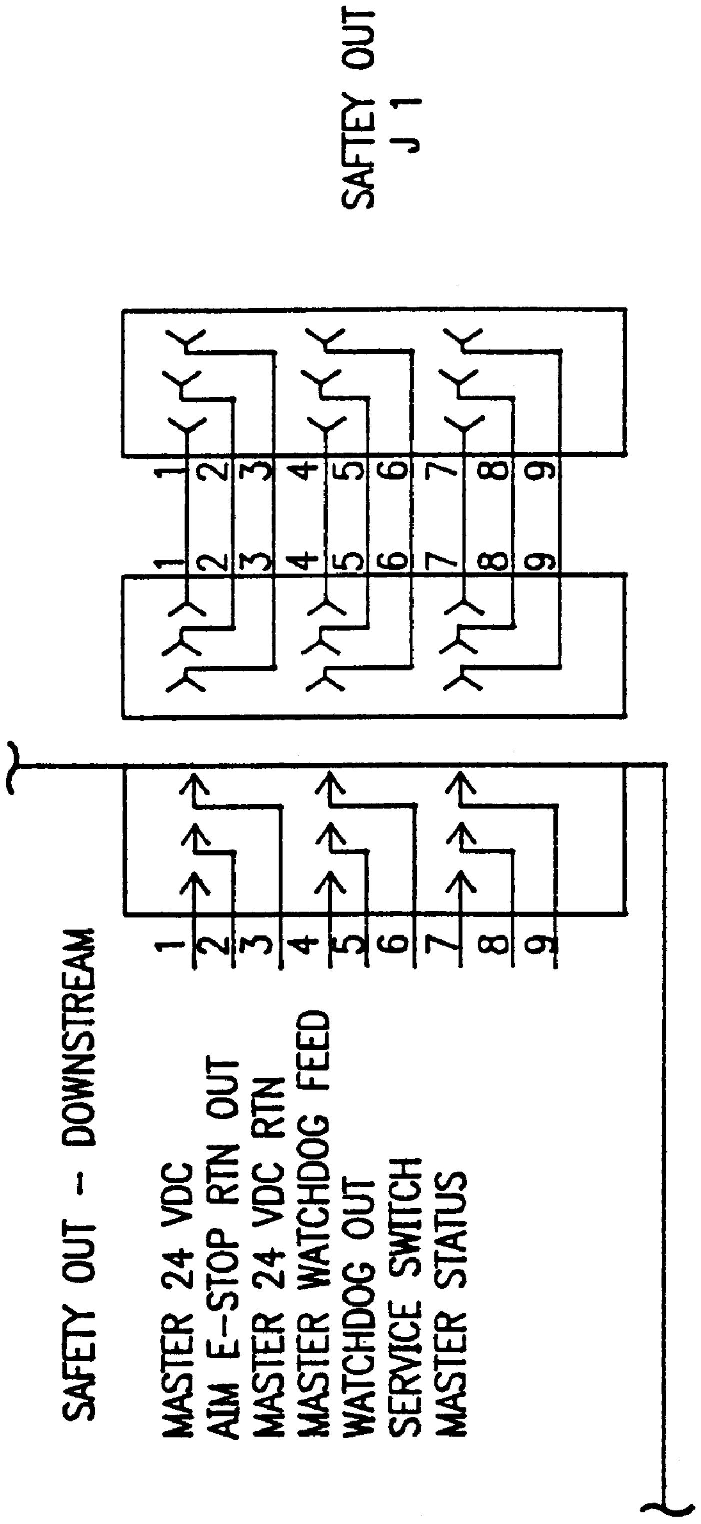

With reference to FIG. 1, a document-processing machine according to the invention includes a diverse-set-compilation section and a base inserter. The diverse-set-compilation section includes a sheet-supplying means comprising, e.g., a roll-unwind 3 and a burster 5 for supplying a seriatim stream of individual documents. A reader 7 reads an indicia, e.g., an optical mark or barcode, on a master document of an individual set of documents within the seriatim stream.

An accumulator 9 uses information read from the indicia to accumulate the proper number of documents in the set and outputs sets of documents to a folder 11. After being folded, the document set is output to a buffer 15 via a divert section 13, which is actuated upon the upstream detection of an error relating to the set. The buffer 15 preferably comprises a multi-stage device, such as an eight-stage multi-level buffer.

Sets output from the buffer 15 are delivered to a base inserter via an end-module interface 25. The base inserter includes a series of insert hoppers "a" through "n" for selectively feeding inserts onto the compiled sets as the sets travel past on an insert track. Unlike the diverse-set-compilation section, the base inserter preferably includes a series of stations which can each perform its function in the same time duration for each set traveling therethrough, regardless of such changing variables as set size and form length. Because of this, the stations of the base inserter can all be operated synchronously and at a common throughput speed. Thus, in order to obtain a high throughput rate though the base inserter, sets should preferably be delivered from the diverse-set-compilation section to the base inserter at a speed which closely matches the base inserter's common throughput speed.

As set forth above, however, as variables such as set size change from one set to the next, the rate at which those sets can be processed by the accumulator 9 will vary accordingly. For example, it would take approximately twice as long to accumulate a set having a set size of four documents than it would to accumulate a set having a set size of two documents. And, if all devices in the diverse set accumulation section are operated at a constant speed, then when the set size jumps from two to four for successive sets, a gap would be created and throughput through the downstream devices would thereby be reduced for subsequent sets of four. This gap represents a loss of throughput.

One solution for reducing this loss of throughput is to detect a change in set size and change the speed of the devices upstream from the accumulator accordingly. For example, when a set size change from two to four is detected, the speed of the upstream devices can be doubled. However, this solution alone is often not viable for high-speed machines due to mechanical limitations in devices such as bursters, cutters, sheet feeders, and transports. Specifically, when operated at high speeds, the inertias associated with such devices prevent them from instantaneously "jumping" from one speed to another. And, a gradual accelleration or decelleration at a burster, cutter, or sheet feeder results in an unevenly-spaced stream of documents being output therefrom.

The invention according to a preferred embodiment thereof includes a diverse-set-compilation section which, in addition to detecting a change in set size and changing the speed of devices upstream from the accumulator accordingly, provides a means for detecting the state of variables associated with various devices and dynamically providing speed control changes such that document sets are output to the base inserter at a rate which matches or approaches the rate at which the base inserter can receive them.

This dynamic speed control preferably includes a set of rules which are used to control the burster's throughput speed. This set of rules comprises, e.g., the following:

As the buffer empties, increase the speed of the burster;

As the buffer fills, decrease the speed of the burster;

As set size increases, increase the speed of the burster;

As set size decreases below size for machine speed, decrease the speed of the burster;

As form length gets shorter, set size for machine speed gets larger; and,

As form length gets longer, set size for machine speed gets smaller.

Further, the machine of the invention may implement rules which control the speed of the base inserter. Such rules include, e.g.:

As the buffer empties, decrease machine speed;

As the buffer fills, increase machine speed.

It will be understood by those skilled in the art that these rules can be used in various combinations without departing from the spirit and scope of the invention. "Machine speed" refers to the speed at which the base machine is operating. "Set size for machine speed" refers to the maximum number of pages per set for which the burster can keep up with the base machine at the given machine speed. It should be noted that the speed changes made at the burster 5 according to the above rules are preferably reflected at the reader 7 by tying the reader's transport speed to the speed of the burster 5.

The microfiche appendix attached hereto contains source code which illustrates certain software aspects of the invention. The hardware of the invention according to a preferred embodiment will now be described with reference to FIG. 1.

The diverse-set-compilation section is comprised of major modules which are in-turn comprised of devices. The four modules according to the embodiment illustrated in FIG. 1 are the Burster, Reader/Accumulator, Folder/Diverter, and Buffer. The devices are the Burster 5, the Reader 7, Accumulator 9, the Folder/Diverter 11/13, the Buffer 15, and the Roll-Unwind 3. Each module, with the exception of the Burster 5 and Roll Unwind 3, contains a Distributed Control System (DCS) Local Control Module (LCM) which oversees and controls all operation of the module. The LCM's are illustrated as LCM1, LCM2, and LCM3 in FIG. 1. The LCM's each preferably comprise a series of Printed Wiring Boards (PWBs) for receiving inputs, performing control functions, and sending outputs. The PWBs are described in further detail below.

Each of the modules which contains an LCM is preferably capable of full standalone operation utilizing a DCS diagnostics interface. In addition, stand-alone operation with some or all modules connected is possible. The Roll Unwind 3 is preferably capable of limited stand-alone operation.

System Control

The control system of the diverse-set-compilation section preferably incorporates a modular architecture design which allows for future expansion as well as improved testability. Control is distributed across the major modules. The devices within a module are preferably configured so that each may be controlled in a module stand-alone operation or as a system when multiple modules are incorporated. As components of the DCS, all modules have standard features available to them, including but not limited to power-up self test, diagnostics, and configuration utilities.

The Burster module 5 utilizes a local non-DCS controller LC for internal operations. If a trim unwinder is provided, it may include a trim vacuum system which is under control of the Burster 5. The Burster module's controller LC is interfaced to the Reader/Accumulator module LCMI via an RS-232 full-duplex asynchronous communications link 19 for control and diagnostics.

The LCMs within each module are interconnected using a Queued Serial Protocol Interface (QSPI) 17. The QSPI interface 17 is an RS-485 based multi-drop Motorola synchronous communication link. In the embodiment illustrated in FIG. 1, the Reader/Accumulator local control module LCM1 functions as a Command Module. The Command Module operates as the logical master of the QSPI datalink, and runs the dynamic speed control software illustrated in the microfiche appendix attached hereto.

The Command Module interfaces to the host computer 23 of the Host Inserter via a full duplex optical inserter communications interface 21. The host computer 23 controls operation of the base inserter, and preferably includes a CRT, keyboard, and a control panel, which are collectively referred-to herein as the Inserter User Interface (IUI). Operator interface with both the host inserter and the diverse-set-compilation section is done through the IUI, with the exception of local adjustment control switches and emergency stop switches. Data entered through the IUI is used to automatically set up and control the diverse-set-compilation section. This data preferably consists of, but is not limited to, the following:

1. Form Size, including trim width and thickness.
2. Fold set up.
3. Read data and probe set up.
4. Folder limit.
5. Maximum feed rate limit.
6. One or Two up operation.
7. Fixed set size.
8. Reading On/Off It should be noted that the term "master module" as used herein refers to the single module which electrically interfaces to the base inserter safety interface. The term "slave module" refers to all other modules within a given diverse-set-compilation section which are not designated as the "Master". The term "Command Module" refers to the single module which oversees control over a given diverse-set-compilation section and interfaces to the base inserter via the inserter communications interface 21.

Each LCM preferably comprises a card cage having therein a host VME processor board and supporting I/O boards. The Reader Module's local control module LCM1 additionally includes a reader board for processing signals from the reader.

FIG. 2 illustrates certain electronic portions of the diverse-set-compilation section of the machine according to the invention. A power box 101 supplies electrical power to the various electronic portions, such as the PWBs and motor controls. An I/O interconnect 103 provides a central board for receiving and routing I/O signals from the various electrical portions. A card cage 105 is provided for each module, and contains printed wiring boards which function as a local controller for the module. Although only the Command Module's card cage is shown in FIG. 2, it should be understood that the other Local Control Modules LCM2 and LCM3 comprise similar card cages which communicate with the Command Module LCM1 via a QSPI interface 17 (FIG. 1). It should be noted that the word "Advantage" is used on FIG. 2 to refer to the base inserter, and the words "AIM" and "HTA" are used to refer to the diverse-set-compilation section.

The card cage 105 preferably includes a VME processor board 107, an I/O interface board 109, a Serial Communications board 111, and a reader board 113. These boards will be described in detail below.

The VME processor board 107, also referred-to herein as a CP331 PWB, utilizes a Motorola MC68331 32-bit integrated microcontroller. A communications cable bus interconnects the VME processor board of each LCM card cage. The CPU PWBs in the end modules, normally the Reader/Accumulator and the Buffer, have termination resistors installed for the QSPI bus. In addition, the QSPI arbitration signal path is completed via jumpers on communications interface PWBs in the end modules. The arbitration line is only used during communications initialization. Any error in the arbitration line during initialization will inhibit communications to all non-Command modules.

The resources internally available to the MC68331 include a periodic interrupt timer, UART, watchdog, direct bit I/O and automatic decoding for chip select, bus interface, and auto-vectored interrupt acknowledge. FLASH EPROM is provided on the VME processor board 107 for program storage, and static RAM is provided for data, stack, and vector table usage. A Zilog Z85230 16 Mhz Enhanced Serial Controller is provided for serial communications. A field-programmable Logic Cell Array (LCA) is provided for implementing the VME and Z85230 interface logic. Two RS-232 full-duplex serial ports and one RS485 based multidrop Motorola synchronous peripheral interface port are provided.

The I/O interface PWB 109, also referred-to herein as the IO332, comprises a general-purpose VME bus-compliant input/output interface controller which utilizes a Motorola MC68332 integrated microcontroller. The I/O inlerface PWB contains sufficient resources, including shared memory with the VME bus, to off-load low-level digital and analog I/O as well as complex motion-control tasks from a VMEbus master. FLASH EPROM is provided for program storage and static RAM is provided for data, stack, and vector table usage. A Zilog Z85230 16 Mhz Enhanced Serial Controller is provided for serial communications. A field-programmable Logic Cell Array is provided for implementing the VME bus interface logic. The I/O interface PWB includes 24 digital inputs and 24 digital outputs, as well as 2 analog inputs and 2 analog outputs.

When the VME processor board 107 generates a signal indicating that the speed of a motor, e.g., the motor 49, should be set to a particular level, the I/O interface PWB 109 receives that signal and generates a PWM signal that is received by the motor controller 47 via the I/O interconnect PWB 109. The motor controller 47 receives that PWM signal and applies a particular voltage to the motor 49 accordingly.

The Serial Communications board 111, also referred-to herein as the SIO-04, preferably comprises a four-channel serial input/output module. The Serial Communications board 111 provides an external interface to the VME-based control system via four serial data channels. The Serial Communications board 111 includes two enhanced serial communications controllers which operate four high-speed, multi-protocol serial channels in both synchronous and asynchronous modes of operation. Of the four serial data channels (coml through com4) on the Serial Communications board, two are dedicated to EIA-485 communications and the other two are dedicated to RS-232-C communications. The board has a 256-byte memory-register address block which may be physically relocated anywhere within the allowable 64 k VMIE short address space via a pair of rotary switches which are provided for selecting address bank and address block, respectively.

The reader board 113, also referred-to herein as the URM-04, comprises a reader interface which permits the VME processor board 107 to receive reader data relating to the set passing through the reader. Such data includes, e.g., set size.

Referring again to FIG. 1, the diverse-set-compilation section releases a completed set to the host inserter upon request via message through the inserter communication interface 21, providing that a set is ready. The host inserter also sends a message to remove the request and inhibit the diverse-set-compilation section from releasing a set. A separate request message is received by the diverse-set-compilation section for each set to be released. If a set becomes ready after the request to release but before the host removes the request, the set will be released.

The diverse-set-compilation section may utilize a product detect sensor at the mechanical interface 25 to detect proper transportation of released sets. If improper transportation is detected, the diverse-set-compilation section signals the error to the host inserter and indicates the error at the IUI.

Burster

The burster 5 (FIG. 1) preferably comprises an asynchronous, continuously running burster with a slitter merger. The burster 5 is preferably of the type having an infeed form sensor for sensing an approaching web, a set of slow-speed bursting rolls followed by a set of high-speed bursting rolls, and a delivery sensor for detecting burst forms and the gap between forms as they exit. The burster 5 is equipped with one center-slitter for two-up forms and two edge-slitters for trim removal. Trim may be removed by either an industrial vacuum system or a portable trim winder.

The Burster 5 preferably comprises a local control system to handle specific device control. The local control system receives commands from the DCS in the Reader Transport Module, which in-tum receives status information back from the Burster. The Burster 5 is provided with form size and feeder mode information from the diverse-set-compilation section DCS when received from the IUI The Burster 5 is also provided with run and stop commands as appropriate based on Host inserter operations as well as local diverse-set-compilation section control states. Upon cycling of the Host inserter and request of the diverse-set-compilation section to initiate feeding, the Burster is commanded to start its output motors while maintaining its main drive off. After expiration of a delay provided to allow the downstream Reader Transport to empty, the Burster 5 is commanded to start its main drive, thereby producing bursted sheets.

The Burster is given various output drive speed rates depending on such factors as set size, Host inserter cycle speed, and number of completed sets contained within the diverse-set-compilation section devices at any given time. The Burster speed is governed to operate synchronously with the Reader Transport speed and acceleration rates.

Upon a stoppage of the Host inserter for any reason, the Burster main drive is commanded off while allowing the output drive to remain on to eject any bursted sheets. Upon a stoppage in the diverse-set-compilation section for a jam or critical error, both the Burster main drive and output drive motors are commanded off immediately, exercising the mechanical braking. The Burster reports various status and error conditions to the diverse-set-compilation section DCS which is then used to stop and/or inhibit operation of the machine as well as send status information to the IUI.

The Burster is controlled via communications using an RS-232 serial port. The only local burster controls are Jog Forward and Reverse push buttons for initial setup and clearing jams, and width and depth position rocker switches for fine adjust and clearing jams.

The burster's Local Controller LC preferably comprises an 80C31 CPU module, a servo control module, a power supply module, two isolated DAC modules, a triple motor module, an output control module, and a system interface board for interconnecting those modules to other devices in the diverse-set-compilation section, e.g., the Command Module LCM1. The CPU module comprises a Motorola 80C31 microcontroller for executing local burster control commands. The servo control module comprises a closed-loop digital servo control to open and close the burster's upper slow-speed roll in synchronization with paper perforation position.

The isolated DAC modules are used to permit the CPU to control independently the speed of the Burster's main and high-speed roller motors. The speeds of both motors are identical for one-up mode operating at a differential of 1.83:1 HSR to main paper speed. For two-up mode, the ratio is doubled under software control such that the HSR motor runs at twice the speed of the main motor, and HSR-to-main paper speed is 3.666:1.

The triple motor driver module comprises three H-bridge reversible motor drivers with dynamic braking and adjustable motor current limit. These are used to adjust the slitter/merge tractors and the burster tractors for form width and the slow roll frame for form depth.

The output control module is provided for controlling, based upon signals from the system interface board, the following off-board burster devices: a Main and HSR motor enable/brake relay, Main and HSR reverse relays, inhibit and tachometer reversal to Main and HSR drives, a run timer, a burster counter, and a remote trim vacuum's start/stop.

A typical burster operating sequence starts with mode and position commands. The mode command selects between 1-up single web operation and 2-up slit and merged two web operation at a maximum input speed of 120 ips and 60 ips, respectively. Execution of the position commands results in automatic positioning of slitter/merger tractor width, burster tractor width, burster roll depth, and depth profile for upper slow roll lift eccentric servo. Paper is then webbed using local Jog Forward buttons and covers are closed awaiting system start/run. Any fault conditions such as cover open, paper out, trim full are reported as requested by the control system. Run time faults, such as jams, are reported by the burster as they occur. The burster is controlled by Run, Stop, and Set Speed commands, described below, and outputs Actual Speed on receipt of a request command.

During startup, the burster's Infeed Form Sensor ahead of its slow rolls detects the leading edge of the first form to establish timing of the form relative to the burst position.

This initiates an offset routine to time the profile of a slow roll eccentric lift servo to the form depth being processed and the operating mode, 1-up or 2-up. The eccentric rotates one revolution for every burst, lifting the slow roll to provide web relief, compensating for slight speed differences between the tractors and the slow rolls. While paper is present, the servo follows paper motion and speed, determined by the Main Drive Encoder 45 at twelve pulses-per-inch of paper travel. The position loop is closed by the Servo Encoder at 500 pulses per revolution, to track the burst depth profile, plus an index pulse for error compensation each burst cycle.

A Delivery Sensor located after the high speed bursting rolls detects burst forms and the gap between forms as they exit. The sensor information is used for jam detection.

Burster speed is obtained by a Set Speed command from the control system. The desired speed is transferred to an 8-bit isolated DAC of the Main Drive Control 4, and then to the Main Drive Motor 43. Tachometer feedback is used to provide +/−1% speed regulation. Actual speed in ips is reported when requested by the control system. The Main Drive Motor is coupled to the slitter/merger tractors and slitters, and to the burster tractors, slitters, slow speed rolls and transport belts.

The speed of the burster's high speed roll (HSR) drive follows the Main Drive Set Speed at a ratio determined by the mode selection, 1-up or 2-up, and the form depth to maintain a minimum gap of 3 inches between forms. The HSR Drive Control is also an isolated 8-bit DAC, and the HSR Drive uses tachometer feedback for +/−1% regulation.

The Burster Communication Protocol is implemented in two distinct logical layers, a serial port driver layer and an application specific layer. The serial port driver layer oversees the transmission of a message from initiator to target machines using a simple RS-232 interface. No hardware flow control is implemented. The initiator driver forms a transmit message with a check sum and then sends the message to the target. The target then verifies good message receipt by means of an ACK or NACK message.

In the case of a NACK, or absence of an ACK, the driver retries sending the message. The initiator may not proceed to send a new message until it receives and ACK or exhausts the max retry count for the current message being sent. As a default the driver operates at a baud rate of 9600 bps with 1 start, 1 stop, and no parity bits.

The purpose of the application layer is to interface the host machine to the serial port driver. Information to be transmitted across the serial interface is passed from the initiating or host machine to the driver by the application layer. Information to be received by a target machine is passed from the driver to that machine by the application layer. Once the application layer passes a message to the driver, it is no longer involved in the message's transmission unless the driver encounters excessive transmission failures and/or returns an error condition to the application. At that point the application layer may choose to send a different kind of message and/or signal its host machine.

The communication interface is primarily client/server based with the burster acting as the server. The host (client) initiates most commands and the burster acts on the commands and replies with a response status. Unless explicitly stated otherwise, command packets are initiated by the host and status packets are sent by the burster.

The application layer calls the driver passing command-data-to-be-transmitted. A command packet nominally consists of:

a) A command number. (byte)
b) A reserve byte. (byte)
c) Parametric data, if required (byte)

The command packet is transmitted to a target using an RS-232 port with no hardware flow control. The target receives the command and transmits and ACK/NACK back to the initiator. The target then processes the command. If required, the target transmits a completion status of the command back to the Initiator. The resultant status packet nominally consists of:

a) A command status number (byte)
b) Error type (byte)
c) Error variation (byte)

The Initiator receives the status packet and transmits an ACK/NACK back to the target. The Initiator reports the returned status packet information to its application layer for processing.

A "RUN BURSTER" command is used to make the burster move paper. The command can only be executed after the machine has been adjusted, configured and webbed properly and no fault conditions are pending. A SET SPEED command is issued at least once prior to this command. The command will return completion status. There is no data for this command. Issuing the RUN command while the burster is already running will have no affect and will normally return status with no error. Issuing the RUN command while only the High Speed Output Rollers (HSR) are on will cause the burster to start feeding after adjusting the HSR to minimum speed necessary to re-synchronize the machine. When starting from a complete stop, the HSR will be started prior to the main drive to allow ejection of any remaining sheets from the delivery area.

A "STOP BURSTER" command is used to stop the burster, and can only be executed after the machine has been started via the RUN or RUN HSR commands. The command will return status upon completion (burster stopped). Issuing the Stop command when the burster is stopped will have no affect and will normally return status with no error. There is no data for this command. The burster will decelerate using the normal programmed rate. The main drive will be stopped prior to the High Speed Output Rollers to allow for ejection of any sheets from the delivery area. The tractors will stop with the lead edge of the web 1 +−0.5 inches past the breaker blade.

A "SET SPEED" command is used to set the burster output speed. This command may be issued at any time. If this command is issued when the burster is stopped the speed value is saved as the new burster speed when the burster is enabled to run. The command will return status to acknowledge that the burster has received and accepted the new set speed. If the burster cannot attain the desired speed based on implemented accel/decel profiles an emergency fault status packet shall be returned. The burster will automatically adjust the input speed based on 1 up or 2 up mode of operation and form size.

An "ACTUAL SPEED" command is used to get the actual output speed of the burster from the rotary encoder 45. The command can be executed at any time. Command will return speed and completion status.

Reader Transport Control

The transport of the Reader 7 serves three primary functions. First, it provides a location for reading system hardware to scan bar codes and optical marks. Second, it provides a multiple stage buffer for individual pages between the Burster and the Acumulator to compensate for the limited deceleration rate of the Burster. Third, it reduces the gap between sheets.

The limited controlled deceleration of the Burster, along with the maximum operational speeds of the Accumulator, Folder and Buffer, and limited Buffer capacity, dictate the physical relationship between the reader scan heads and the Accumulator.

Data which determines the set breakup should be presented to the control system early enough to allow the Burster Speed to be reduced from a maximum at larger set sizes to a sufficient minimum to prevent overrunning the slower downstream devices and merging of sets. This data is usually obtained from the reading system. At worst case, using first page demand feed logic with bar codes at the end of the form, the set breakup data is not available until the last page of a set is two forms past the scan heads and the first page of the next set is just past the scan heads.

By providing an extended linear transport distance between the scan heads and the Accumulator, the Reader Transport in effect acts as a synchronous multiple-single-sheet stager. Several pages comprising different sets can occupy the Reader concurrently. Since transport speed of sheets cannot be controlled individually, the Reader drive motor 49 is used for feed control in the same manner that a clutch or solenoid would be used to control an asynchronous staging device.

Control of the Reader Transport motor 49 is accomplished using the I/O interface PWB 109, which allows full closed loop speed regulation. The I/O interface PWB 109 is programmed to generate a PWM control output signal where 50% is off and 100% duty cycle is full speed to drive the Reader's single-quadrant DC motor controller 47. The I/O interface PWB 109 utilizes a quadrature rotary encoder 27 for speed feedback from the motor 49. With closed-loop operation capability, there is little or no requirement for manufacturing or service adjustment of motor speed.

The closed-loop control also allows for motor stall error detection. That is, when the speed-control logic issues a command for the motor 49 to operate at a particular speed, the I/O interface PWB 109 generates a PWM control output signal at a voltage which is selected to drive the motor at the desired speed. After an initial delay to allow the motor 49 to reach the desired speed, the actual speed output from the quadrature rotary encoder 27 is examined by the control logic to determine whether the motor has responded properly and substantially reached the desired speed. If the actual speed is still lower than said desired speed, the voltage is incremented and the actual speed is examined again after another delay. If the actual speed still does not meet the desired speed, the voltage is again increased. If a voltage significantly higher than the selected voltage is reached and the motor's actual speed still has not reached the desired speed, an error is flagged by the control logic. A significantly higher voltage may be a voltage which is a predetermined percentage higher than the selected voltage. A significantly higher voltage may be a voltage which exceeds the selected voltage by a predetermined amount. A significantly higher voltage may also be a voltage which represents the highest voltage in a range of voltages which would be expected to produce the desired speed if the motor is operating properly. A significantly higher voltage may be a predetermined maximum voltage for the motor. The error generated results in, e.g., the motor being shut down and/or an error message being generated at the IUI. This error-flagging speed control can be applied to any motor on the machine which is controlled in a closed-loop manner.

The linear speed of the Reader Transport is automatically varied dynamically during system operation in unison with the Burster speed. The linear speed relationship between the output of the Burster and the Reader is constant as determined by the ratio of the maximum Burster speed and the Maximum Reader speed. With the Reader always operating proportionally slower than the Burster, the larger gap allows the Reader Transport and subsequent devices to operate at lower transport speeds while maintaining maximum throughput of the Burster.

The speed of the Reader 7 (and Burster 5) is varied depending on such factors as set size, Host inserter cycle speed, and number of completed sets contained within the diverse-set-compilation section devices at any given time.

Since the Reader Transport motor is used for feed control, the motor does not necessarily cycle on and off with other motors in the diverse-set-compilation section. Motor operation is based on the running state of the Host inserter as well as the capability of the downstream devices to accept additional sets.

Accumulator Control

Control of the Accumulator transport motor 53 is accomplished using the I/O interface PWB 109 in the Reader/Accumulator's local control module LCM1. This I/O interface PWB allows for full closed loop speed regulation, and is programmed to generate a PWM control output signal where 50% is off and 100% duty cycle is full speed to drive a single quandrant DC motor controller. The I/O interface PWB 109 utilizes a quadrature rotary encoder 55 for speed feedback from the motor 53. The linear speed of the Accumulator transport motor 53 remains constant during steady-state operation. The motor 53 is operated when the diverse-set-compilation section is operational and in a standby or feeding state.

Figure 3:
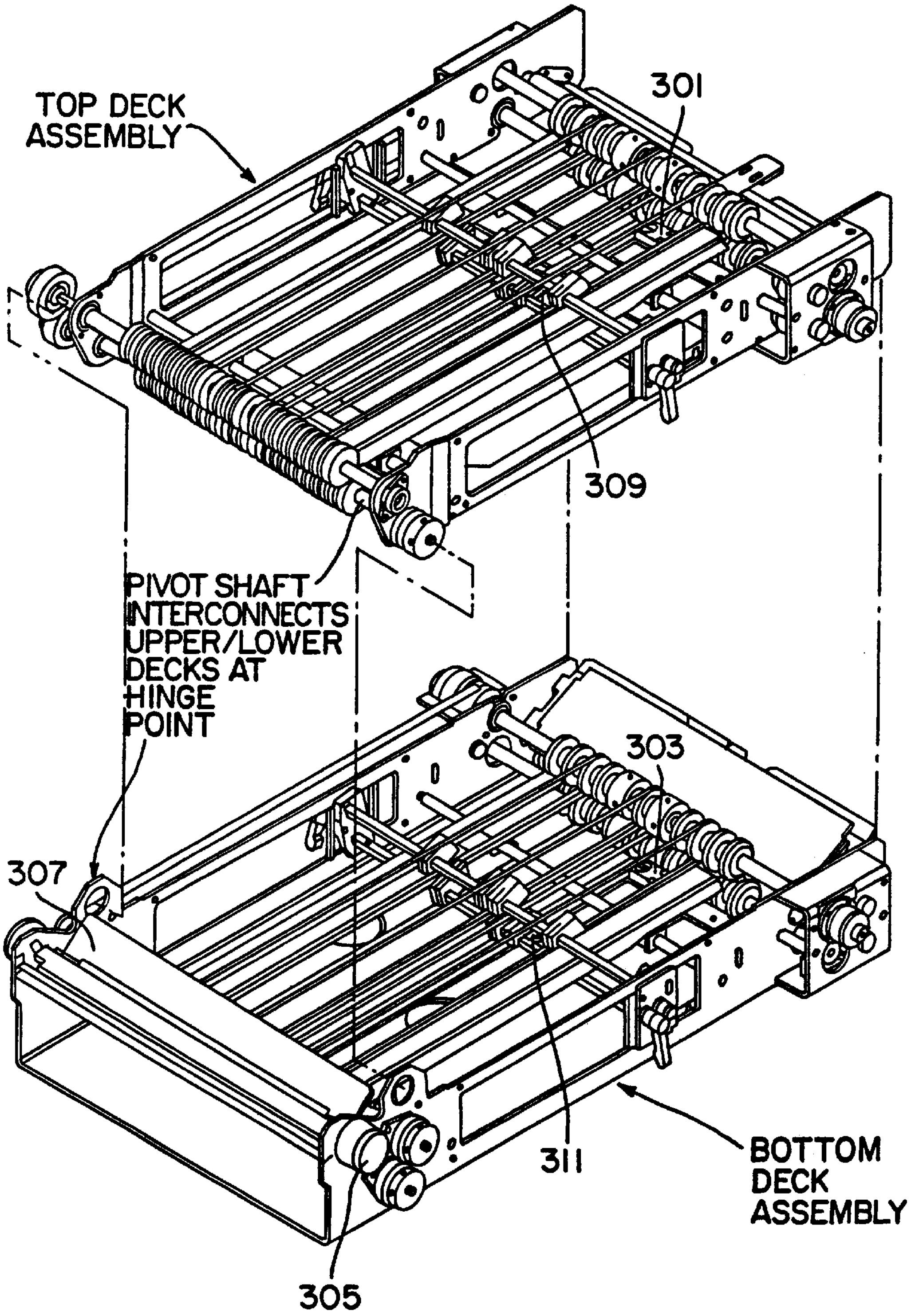
FIG. 3 illustrates a multi-level accumulator of the invention according to a first embodiment.

FIG. 3 illustrates a schematic perspective view of a multi-level accumulator 9 utilized by the invention according to a first embodiment. Product detect sensors 301, 303, 309, and 311 are located within the decks of the Accumulator 9 to allow accurate form tracking, jam detection, and device control. Additional product detect sensors may be provided at the entry and exit of the accumulator. If a jam is detected, all upstream motors are shut down immediately and all downstream motors are allowed to sequence off.

The sensors 309 and 311 are preferably count sensors used to track each form entering the associated deck. The sensors 301 and 303 are preferably presence sensors used to detect the presence of a set in the deck as well as the exit of a set from the deck. Deck selection is controlled via operation of the gate solenoid 305 to position the divert gate 307. During steady-state operation the deck selection will normally alternate at each new set.

The solenoid 305 operated with a PWM signal, which allows the coils to be over-energized during initial activation with 100% duty cycle to improve response time. Once a solenoid reaches the final energized position, the duty cycle is reduced to prevent overheating or damage. The gate 307 is left in a neutral position when the Accumulator transport motor is off. An entry product detect sensor is used to time the operation of the gate solenoid(s). The solenoid is timed such that the gate mechanism reaches proper position when the trail edge of the last page of a set is approximately one-half inch upstream from the upstream edge of the gate. The form length, current speed of the form, and response time of the solenoid(s) are all considered dynamically when determining this timing.

If a non-transportable jam is detected at the entry of a deck, the gate solenoid(s) will be operated to direct subsequent forms into the opposite deck regardless of whether that deck is empty provided that it too does not contain a jammed form. This will minimize forms damage, while possibly merging multiple sets in the non-jammed deck. Should this occur, the merged sets will be detected as an error and flagged for automatic downstream diversion.

Output control of each deck is accomplished using a clutch and brake on each. Several conditions must be satisified in order for a deck to release a set. A completed set must be in the deck. The transport motor must be on and at speed. The downstream device (Folder) must be ready to accept a set. Any set previously released to the downstream device must have cleared the Accumulator exit sensor before another set can be released.

Normally, the decks will release completed sets in the order that the sets are completed. A set is considered complete when either the last page of the set has cleared the deck count sensor and arrived in the deck or if an error occurs in the deck. An error can be caused by a jam, incorrect collation, or improper material transport or sensor operation.

An error is also generated if more sheets than any downstream device can handle are fed into a deck. When an error is initially detected, the Accumulator will not release any sets and the diverse-set-compilation section will stop and indicate an error to the IUI. After the operator has made any required corrections and the system is started, the errored set(s) will be released. Errored sets are flagged for downstream diversion.

When all conditions are satisfied to release a set, the appropriate brake is de-energized and clutch is energized. When the set clears the deck presence sensor the clutch is denergized and the brake is energized. At no time are both associated clutch and brake energized simultaneously. Neither is energized when the Accumulator transport motor is off.

Folder/Diverter

The machine of the invention preferably comprises a belt-driven folder, such as the MB524, which is commercially available from the Mathias Bäuerle company of Germany, with an integrated diverter. Control of the Folder/Divert transport motor 31 (FIG. 1) is accomplished using the I/O interface PWB in the folder/diverter's local control module LCM2. This I/O interface PWB allows for full closed-loop speed regulation. The LCM2's I/O interface PWB is programmed to generate a PWM control output signal, where 50% is off and 100% duty cycle is full speed, to drive the folder/diverter's single-quadrant DC motor controller 29. The LCM2's I/O interface PWB utilizes a quadrature rotary encoder 33 for speed feedback from the motor 29.

The linear speed of the Folder/Divert transport motor 29 remains constant during steady state operation. The motor is operated when the diverse-set-compilation section is operational and in a standby or feeding state.

Buffer Control

Control of the Buffer transport motor 37 is accomplished using the LCM3's I/O interface PWB, which allows for full closed-loop speed regulation. The LCM3's I/O interface PWB is programmed to generate a PWM control output signal, where 50% is off and 100% duty cycle is full speed, to drive a single quadrant DC motor controller 35. The LCM3's I/O interface PWB utilizes a quadrature rotary encoder 39 for speed feedback from the motor. The linear speed of the Buffer transport motor 37 remains constant during steady state operation. The motor 37 is operated when the diverse-set-compilation section is operational and in a standby or feeding state.

Figure 4A:
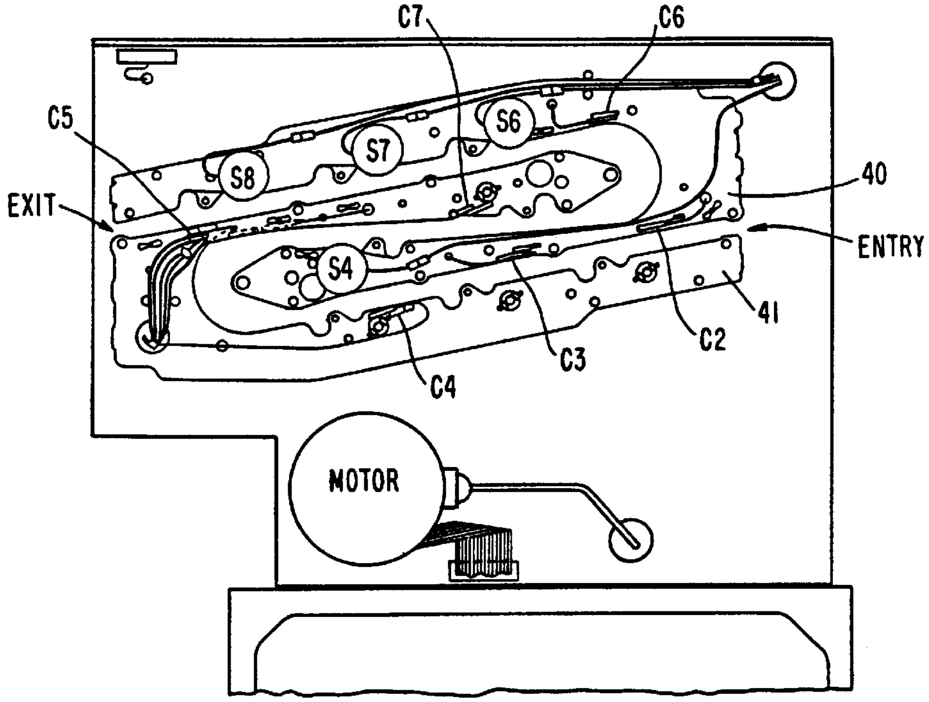
FIG. 4*a* illustrates a partial left side view of a multi-stage buffer of the invention according to a first embodiment.
Figure 4B:
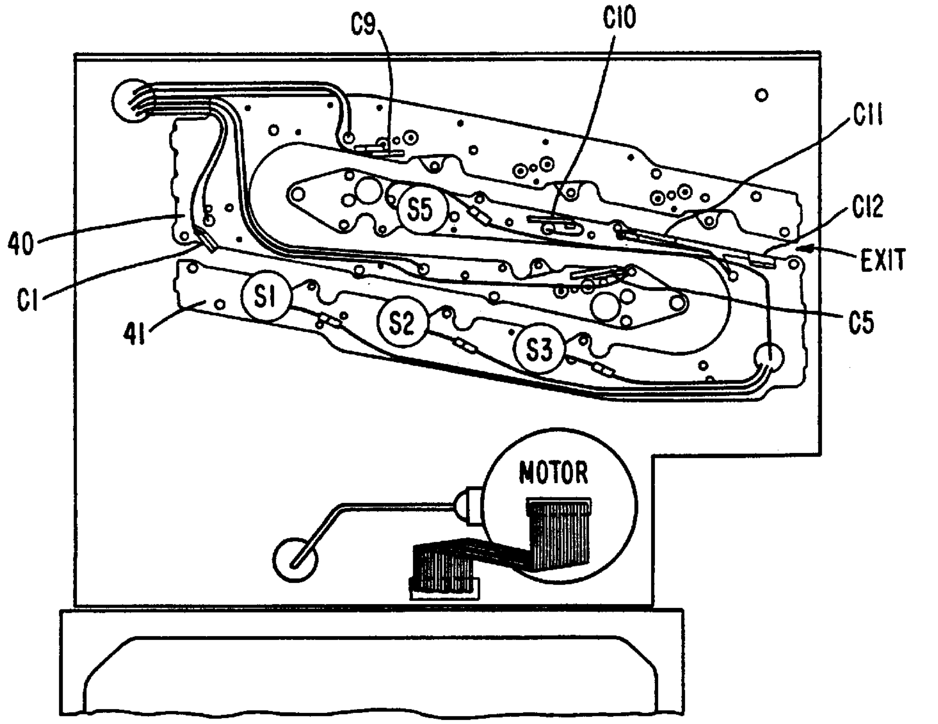
FIG. 4*b* illustrates a partial right side view of a multi-stage buffer of the invention according to a first embodiment.

FIGS. 4*a* and 4*b* illustrate partial left and right side views, respectively, of a multi-stage buffer used by the invention according to a first embodiment. Document sets enter and proceed along an S-shaped path comprising a series of eight stages. A multitude of product sensors C1 through C12 are located throughout the Buffer Transport to track individual sets through the device and to monitor proper transport and detect any jams. The sensors are positioned at the entry, exit, each loop turn-around, and one in each of the eight buffer stages. The sensors enable a sheet jammed over a sensor or between sensors to be detected as an error which will stop the system. If a jam is detected, all upstream motors will be shut down immediately and all downstream motors will be allowed to sequence off.

Control of each of the eight staging areas in the buffer is implemented via a solenoid-operated gate at each stage. The solenoids, S1 through S8, must be activated and the transport motor on in order to release a set from a stage. Each stage is controlled in a similar manner.

A document in the eighth stage is released upon request by the host inserter for a new document. The first, second, fourth, sixth, and seventh stages, which are the stages that do not directly preceed a turn around, are released when either the next stage is empty or a set in the next stage clears the sensor in the next stage. The third and fifth stages, which directly preceed the turn-arounds, are released when either the next associated stage is empty or the next associated stage is released. The third and fifth stages will also be released when a set entering the next associated stage will be released immediately and that set reaches the lead edge sensor in the turn around. In each stage, the gate solenoid associated with that stage is de-energized when the set clears the sensor in the stage. The solenoids are all normally de-enegerized.

When a jam occurs in a device upstream from the buffer, the control logic causes the supply of sheets to that device to be cut off (e.g., by preventing the burster from feeding), but the devices upstream from the buffer are not shut down. The sets which are being processed in the diverse-set-compilation section at the time such jam occurs continue to travel through the machine until they reach the buffer, where they are held in the various stages until the jam is cleared. This manner of operation permits most of the machine to remain operating in spite of a jam in a single device.

While the invention has been particularly shown and described with reference to a preferred embodiment thereof, it will be understood by those skilled in the art that various changes in form and details may be made therein without departing from the spirit and scope of the invention.

What is claimed is:

1. A high-speed document-processing machine, comprising:

a diverse-set-compilation sect ion comprising:

a burster having a local non-Distributed Control System controller;

a reader and an accumulator having a reader/accumulator Distributed Control System Local Control Module;

a folder and a diverter having a folder/diverter Distributed Control System Local Control Module;

a buffer having a buffer Distributed Control System Local Control Module;

wherein all of said Local Control Modules are interconnected via a multi-drop communication link;

said burster local non-distributed control system is connected to said reader/accumulator Local Control Module via a communication link; and, said reader/accumulator Local Control Module is a Command Module including means for dynamically controlling the speed of said burster based on the state of one or more variables affecting the speed at which downstream devices can operate.

2. A high-speed document-processing machine according to claim 1, further comprising a base inserter controlled by a host computer; said host computer being connected to said Command Module via an inserter communication interface.

3. A high-speed document-processing machine according to claim 2, wherein said host computer comprises Insert User Interface (IUI) means for entering data to said Command Module; said data comprising representation of:

form size, including trim width and thickness;

folder set up;

read data and probe set up;

folder limit;

maximum feed rate limit;

one or two up operation;

fixed set size; and, reading on/off.

4. A high-speed document-processing machine according to claim 3, wherein said burster has drive speed rates depending on factors comprising set size, base inserter cycle speed, and number of completed sets contained within said diverse-set-compilation section devices at any given time.

5. A high-speed document-processing machine according to claim 4, wherein said burster comprises a main motor and a high-speed roller motor; said motors having substantially identical speeds for one-up mode operating at a differential of about 1.83:1 high-speed roller to main paper speed; and the speed of said high-speed roller motor is about twice that of said main motor for two-up mode where the high-speed roller-to-main paper speed rating is about 3.666:1.

* * * * *